Figure 1:
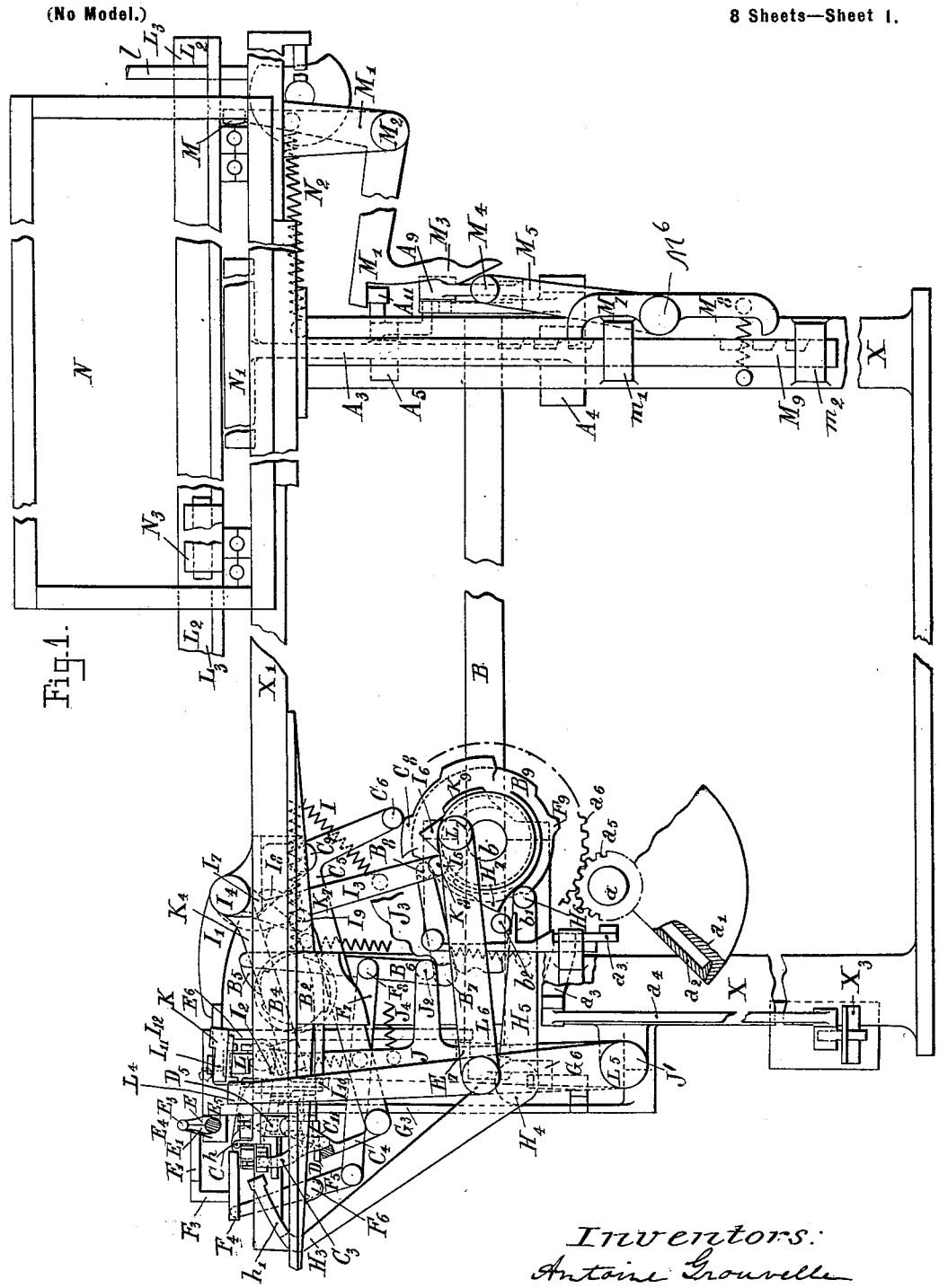

No. 636,660. Patented Nov. 7, 1899.
A. GROUVELLE & E. BELOT.
MACHINE FOR MOLDING FILLERS FOR CIGARS.
(Application filed Dec. 2, 1897.)
(No Model.) 8 Sheets—Sheet 1.

Witnesses:
E. B. Rolton
O. Drummk

Inventors:
Antoine Grouvelle
Emile Belot
By Richards
their Attorneys.

No. 636,660. Patented Nov. 7, 1899.
A. GROUVELLE & E. BELOT.
MACHINE FOR MOLDING FILLERS FOR CIGARS.
(Application filed Dec. 2, 1897.)

(No Model.) 8 Sheets—Sheet 2.

Witnesses:
E. B. Bolton

Inventors:
Antoine Grouvelle
Emile Belot
By Richardson
their Attorneys.

No. 636,660. Patented Nov. 7, 1899.
A. GROUVELLE & E. BELOT.
MACHINE FOR MOLDING FILLERS FOR CIGARS.
(Application filed Dec. 2, 1897.)
(No Model.) 8 Sheets—Sheet 3.
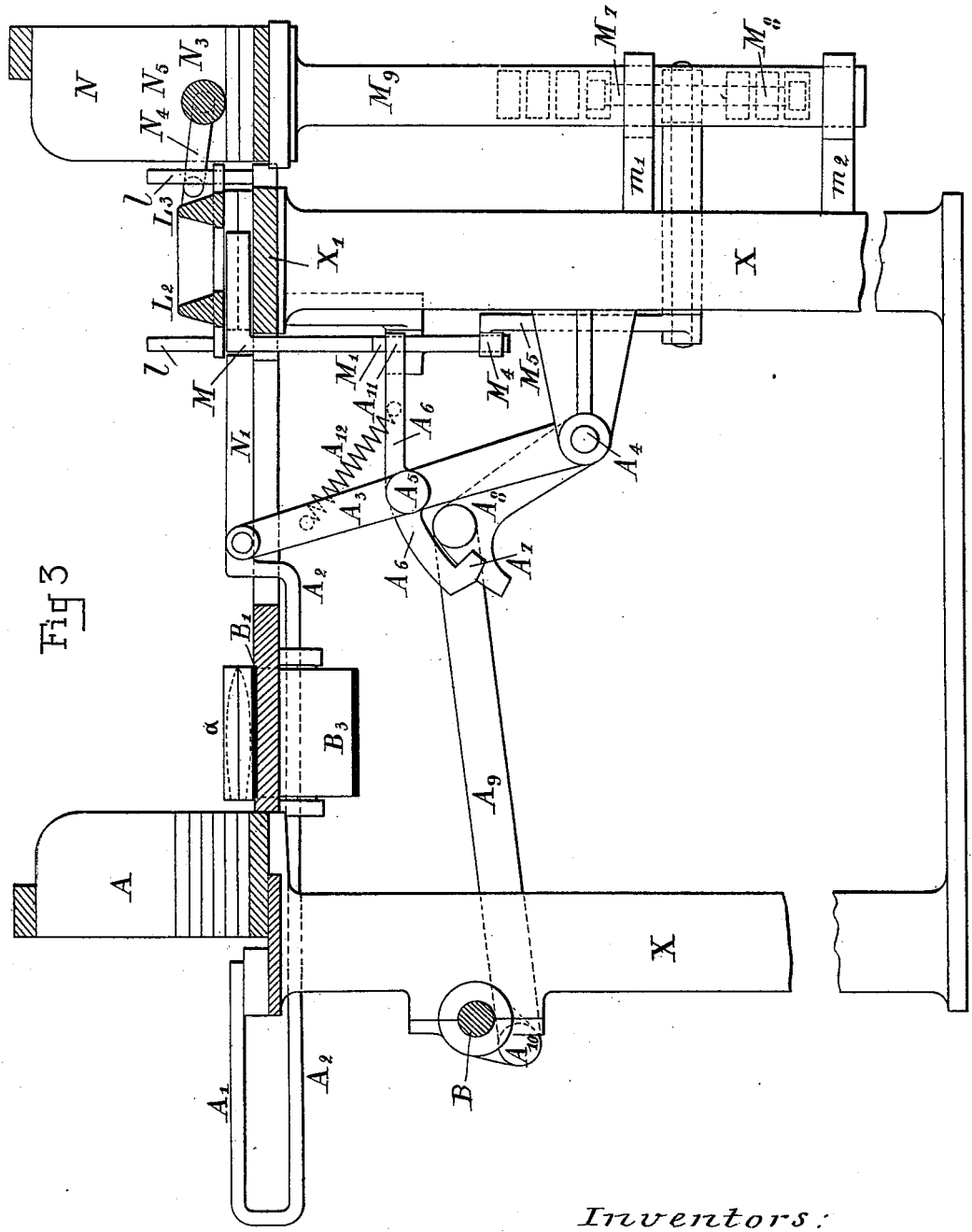
Witnesses:
Inventors:
Antoine Grouvelle
Emile Belot
By Richards
their Attorneys.
THE NORRIS PETERS CO., PHOTO-LITHO., WASHINGTON, D. C.

No. 636,660. Patented Nov. 7, 1899.
A. GROUVELLE & E. BELOT.
MACHINE FOR MOLDING FILLERS FOR CIGARS.
(Application filed Dec. 2, 1897.)
(No Model.) 8 Sheets—Sheet 4.
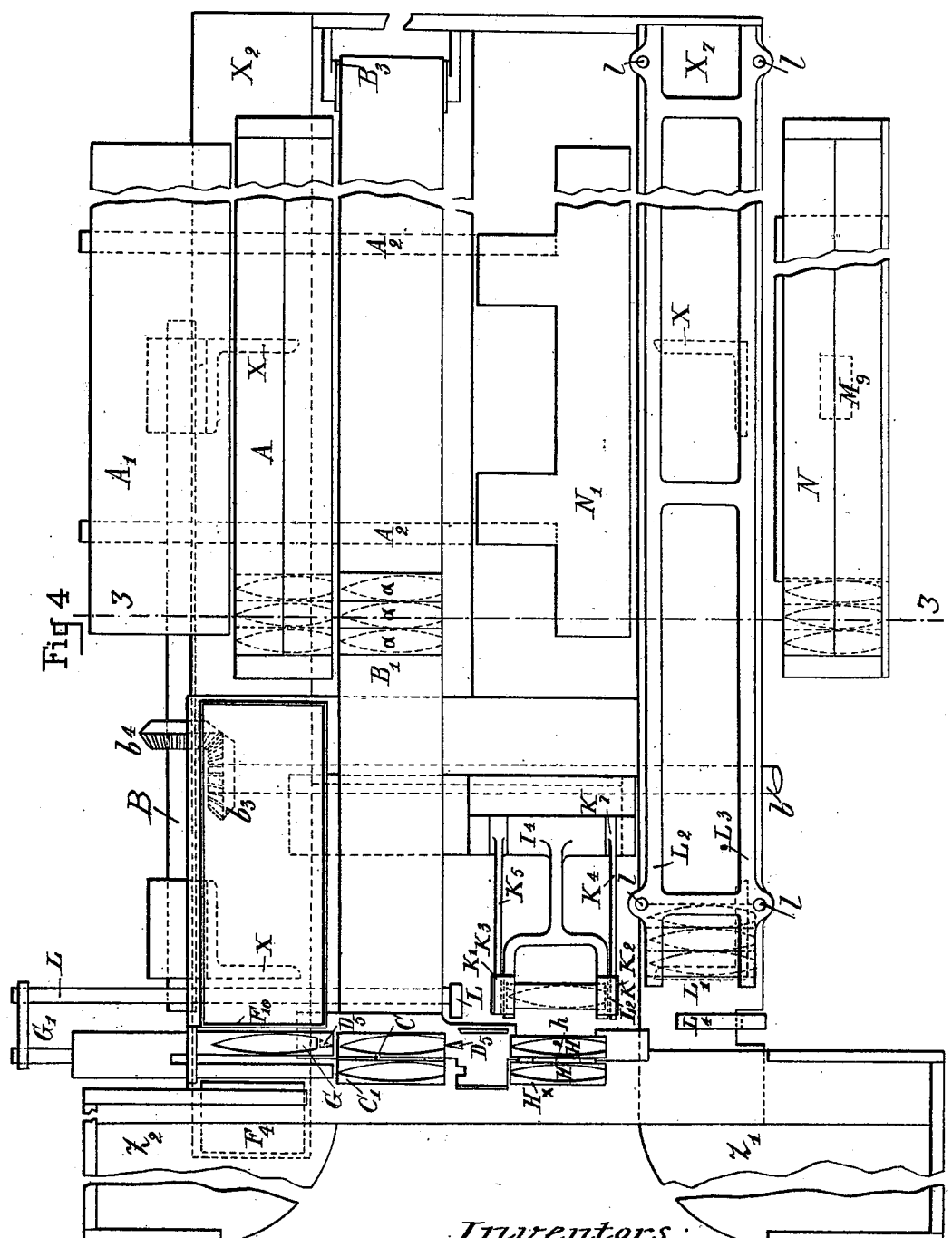

No. 636,660. Patented Nov. 7, 1899.
A. GROUVELLE & E. BELOT.
MACHINE FOR MOLDING FILLERS FOR CIGARS.
(Application filed Dec. 2, 1897.)
(No Model.) 8 Sheets—Sheet 5.
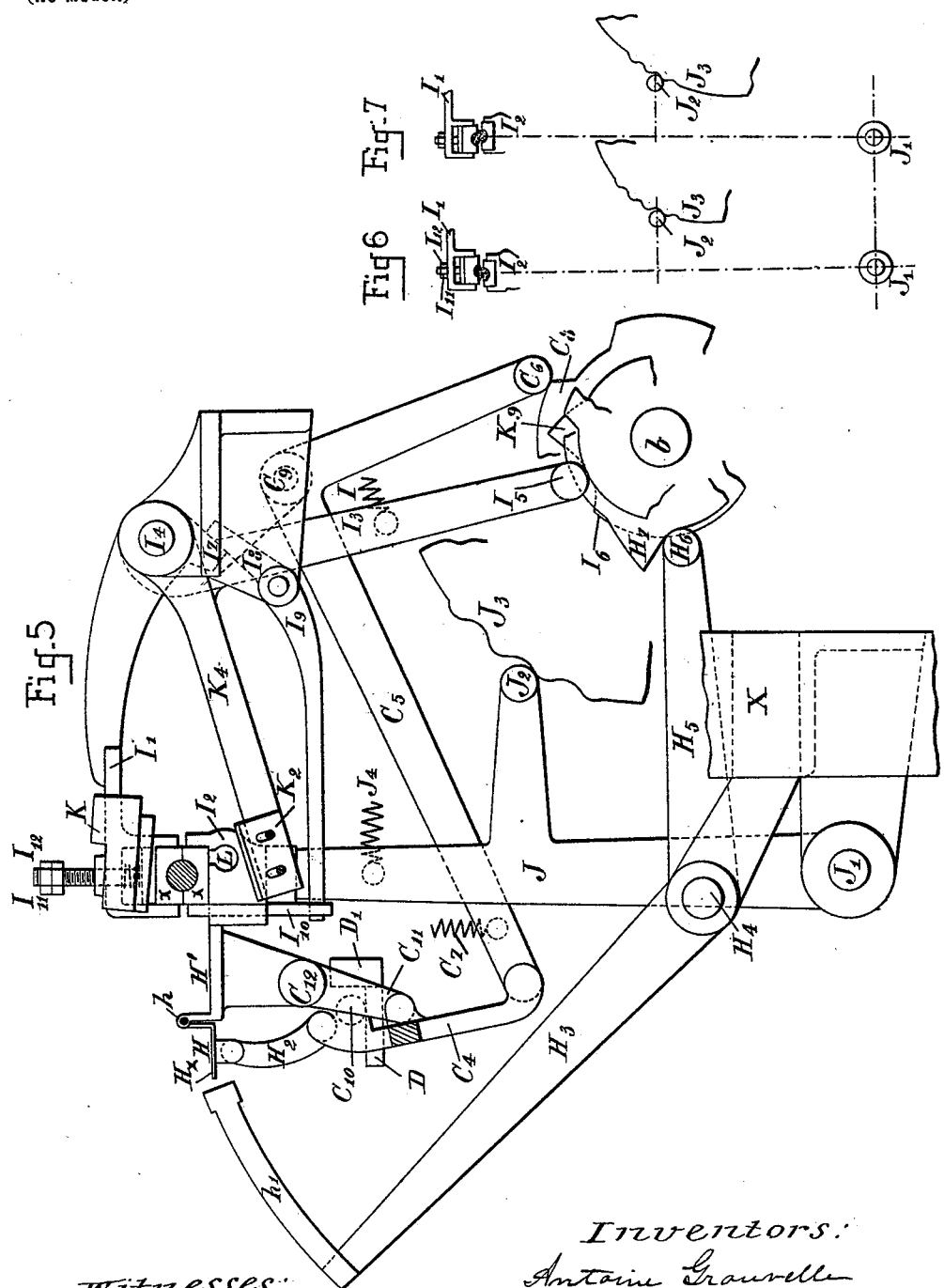
Witnesses:
Inventors:
Antoine Grouvelle
Emile Belot
By Richardson
their Attorneys

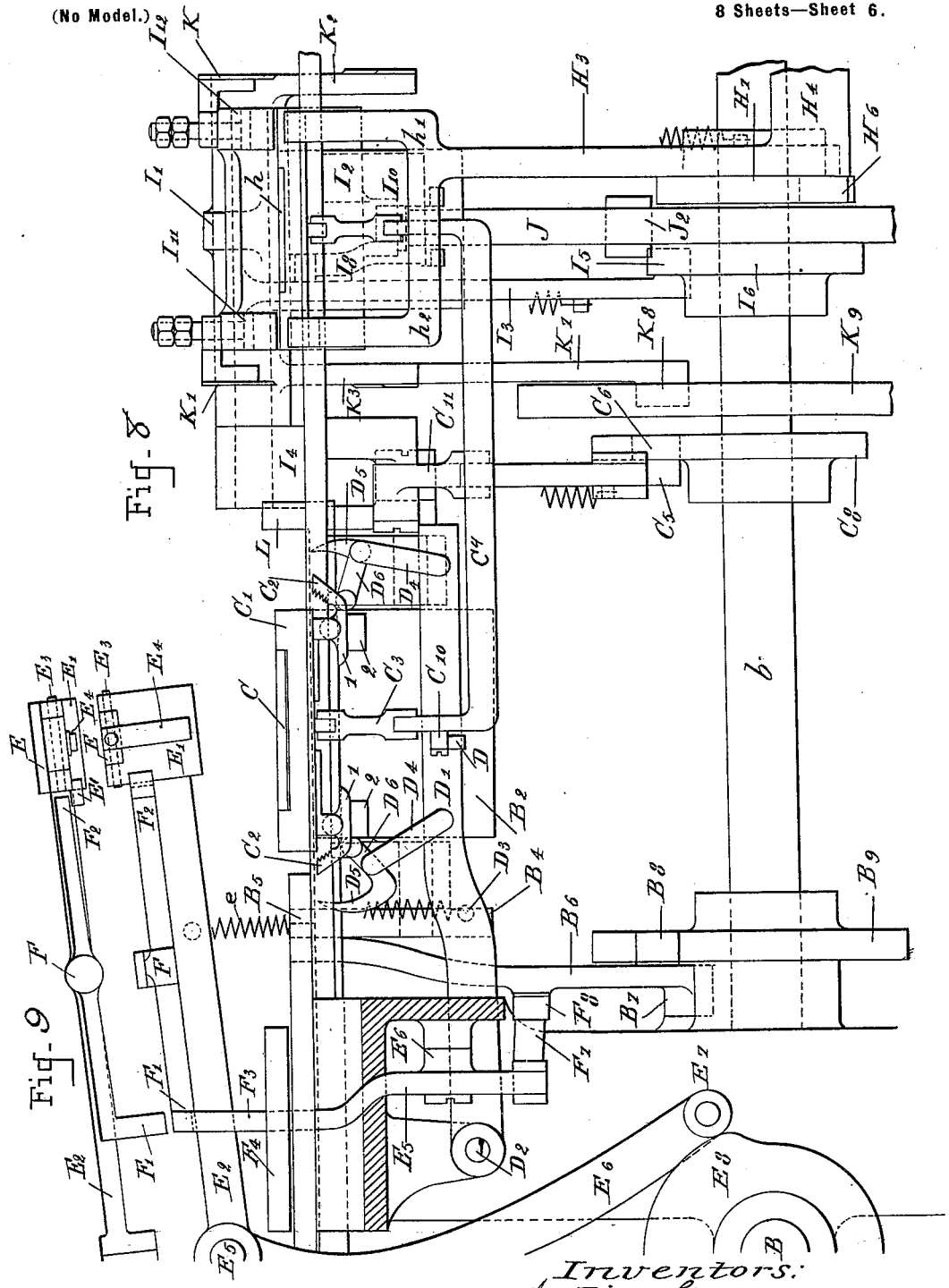

No. 636,660.
A. GROUVELLE & E. BELOT.
MACHINE FOR MOLDING FILLERS FOR CIGARS.
(Application filed Dec. 2, 1897.)
Patented Nov. 7, 1899.
(No Model.)
8 Sheets—Sheet 7.
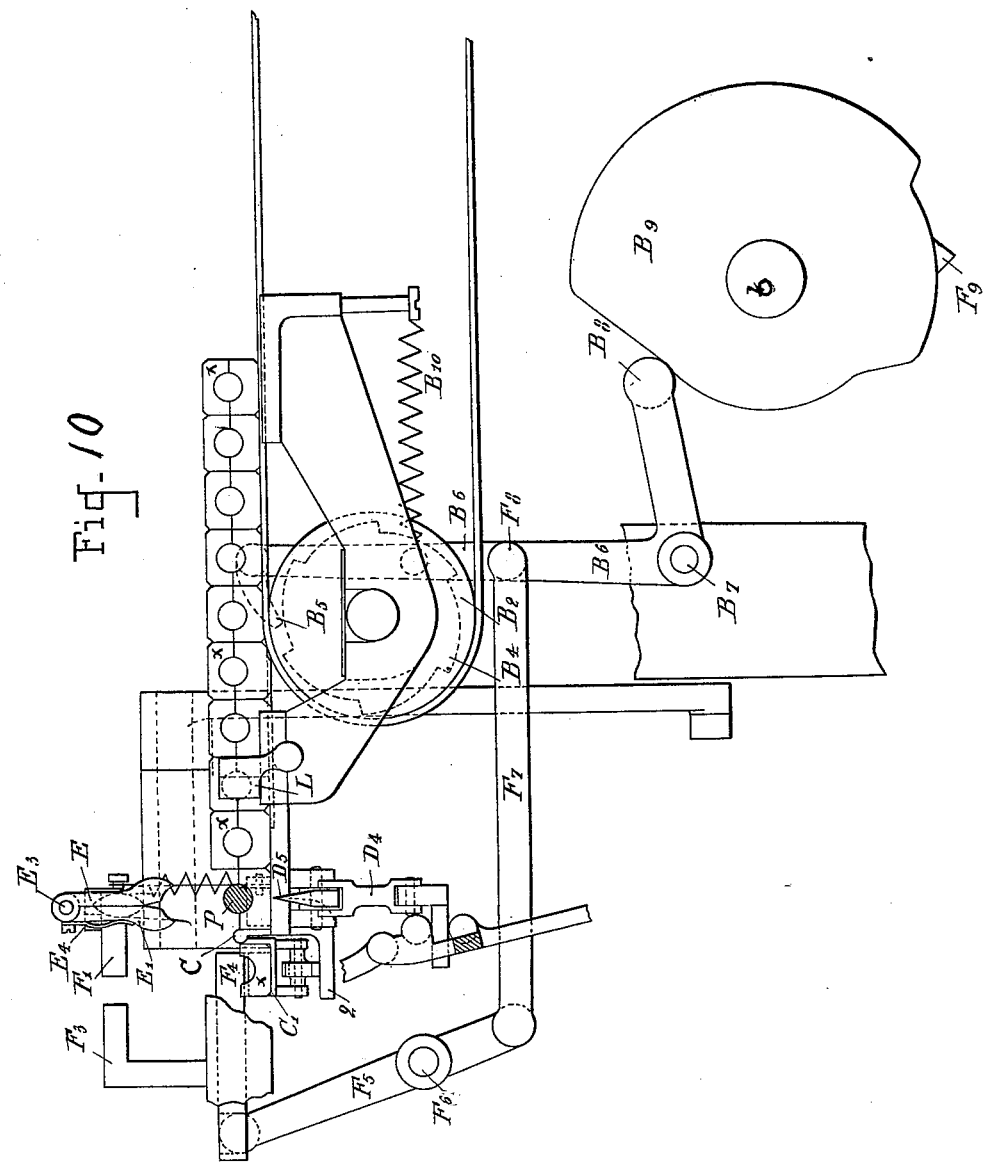

No. 636,660. Patented Nov. 7, 1899.
A. GROUVELLE & E. BELOT.
MACHINE FOR MOLDING FILLERS FOR CIGARS.
(Application filed Dec. 2, 1897.)
(No Model.) 8 Sheets—Sheet 8.
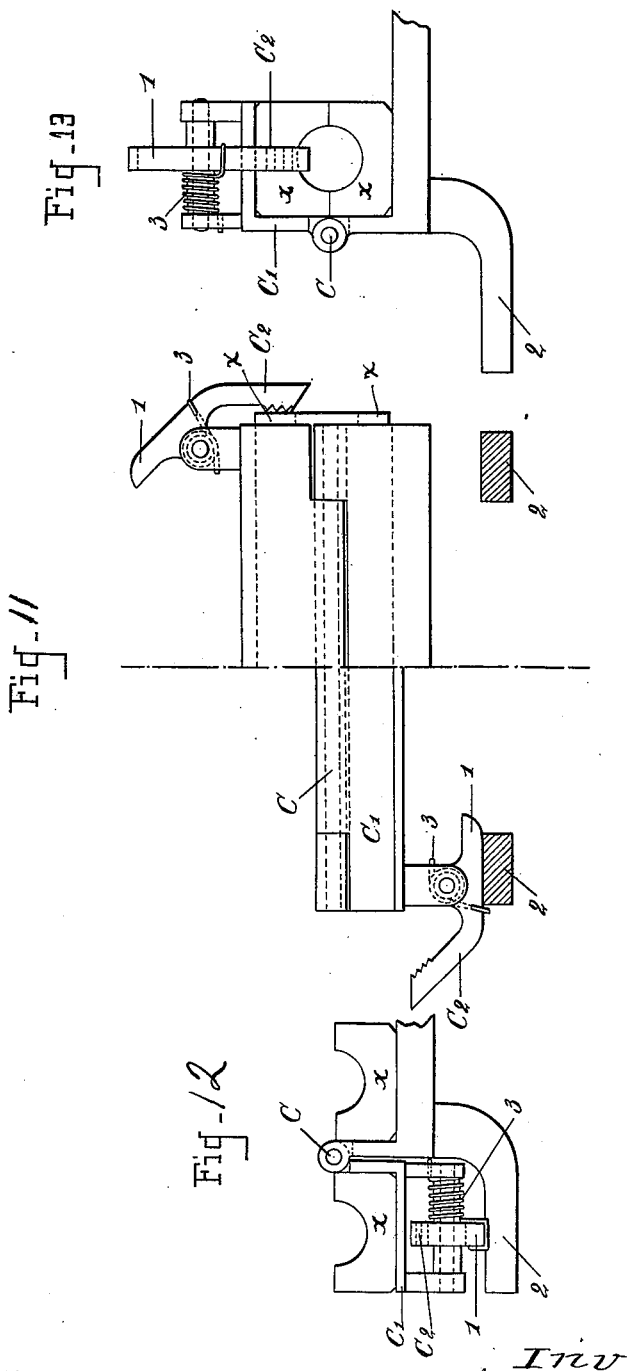
Witnesses:
E. B. Bolton
Inventors:
Antoine Grouvelle
Emile Belot
By Richard
their Attorneys

UNITED STATES PATENT OFFICE.

ANTOINE GROUVELLE AND EMILE BELOT, OF PARIS, FRANCE.

MACHINE FOR MOLDING FILLERS FOR CIGARS.

SPECIFICATION forming part of Letters Patent No. 636,660, dated November 7, 1899.

Application filed December 2, 1897. Serial No. 660,537. (No model.)

*To all whom it may concern:*

Be it known that we, ANTOINE GROUVELLE and EMILE BELOT, citizens of the Republic of France, and residents of Paris, France, have invented certain new and useful Improvements in Machines for Molding the Fillers of Cigars, of which the following is a specification.

This invention has been patented by us in Belgium, No. 127,387, dated April 5, 1897; in Great Britain, No. 8,893, of 1897, and in Germany, No. 102,524, dated April 26, 1897.

In our application for patent filed in the United States Patent Office September 11, 1896, Serial No. 605,493, we have described a cigar-bunch-making machine characterized by the combination of a series of mechanical organs or parts which allow the simultaneous or successive operation of first bringing or presenting the open mold in front of the operator, then placing the two parts of this mold into their mutual relation, and when it is filled and closed submitting it to a series of oscillations for the purpose of doing away with the seams or burs of the bunch, to trim the ends of same, and to drive the molds so filled into a slide, where they remain under pressure until they are carried to the drying-place, an arrangement of rack movement permitting the piling or stacking of such a number of molds as may be desired into the same compartment or pigeonhole for the purpose of easier transportation.

The operator is obliged to go through the following operations: first, to handle the mold in seizing it; second, to open the mold; third, to fill the mold; fourth, to close the mold; fifth, placing the molds under pressure, and the same operations in their inverse order.

The present invention aims at various improvements on the machine which was the subject of our said former application for the purpose of molding said cigar-bunches of long-cut, short-cut, or scrap tobacco, either dry or moist, without the necessity of the operator touching the molds either for the molding of the bunch or for taking the completed cigar-bunch out of the molds or for pressing the bunches which are in the molds.

For a better understanding of the invention we refer to the drawings herewith, in which—

Figure 2:
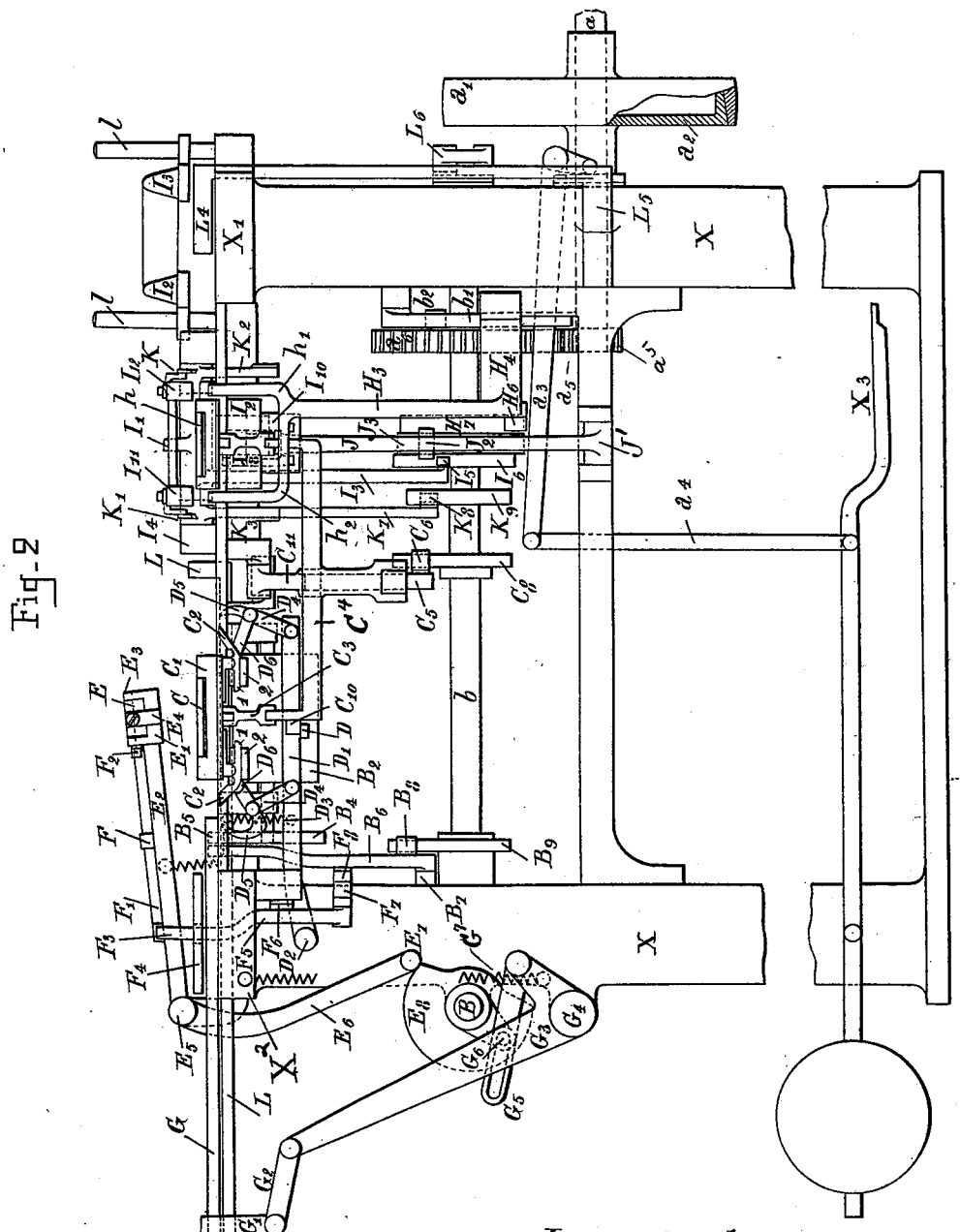

Figure 1 is a side elevation of the machine. Fig. 2 is a front elevation. Fig. 3 is a cross-section along the line 3 3 of Fig. 4, showing also the rear view of the machine. Fig. 4 shows a general plan of the machine. Fig. 5 is a view in partial elevation of Fig. 1 on a larger scale. Figs. 6 and 7 are details illustrating two extreme positions of the jaws which hold the molds in place. Fig. 8 represents a view in partial front elevation, showing more in detail the parts which produce the opening of the molds and the mechanical taking out of the bunch from the molds. Fig. 9 is a detail view of the parts on the upper left-hand corner of Fig. 8 as seen from above. Fig. 10 is a view in longitudinal section, showing the same parts as the preceding figure. Figs. 11, 12, and 13 are detail views showing the action of the parts which procure the opening of the molds for the purpose of permitting the removal of the bunches from the molds mechanically.

The same reference letters and numerals refer to the same elements in the various figures.

The machine consists of a frame comprising the four feet or standards X and the two longitudinal tables $X'$ $X^2$, which support tables $Z'$ $Z^2$, where the operator lays out on one side the leaves serving for wrappers and on the other the tobacco which serves to make the fillers or interiors for the cigar-bunches.

The machine is so arranged as to work as desired in either of the three following manners: first, with engagement by the pedal or treadle $X^3$ and automatic disengagement after one turn of the shaft of the operating-cams; second, in continuous operation by pressing on the pedal or treadle $X^3$ and omitting the automatic disengagement; third, in connection with a machine of any kind which rolls the bunch automatically.

In the first two arrangements the bunch is made by hand by the operator, who feeds it into the machine. The shaft $a$ carries a loose and hollow pulley $a'$, which contains a friction-cone $a^2$, which by means of the bell-crank lever $a^3$, rod $a^4$, and the treadle $X^3$ can be caused to engage with the pulley $a'$. The shaft $a$ has a gear $a^5$, meshing with the gear $a^6$, keyed on the shaft $b$. The roller $b^2$, fixed on the side of this gear, operates at every turn on the cam or finger $b'$, so as to bring about automatic disengagement or throwing out of gear. The shaft $b$ actuates the shaft B by means of the bevel-gears $b^3$ $b^4$. The molds $x$ are made of wood or any other suitable material and consist of two half molds or sockets of even form whose hollow profile governs the shape of the cigar to be made. The compartment or pigeonhole which confines the bunches formerly filled by the machine, which bunches are ready to be taken out, is placed into a receiver A, Figs. 3 and 4, in such a manner that the pusher A', which is as long as the compartment and a little shorter than the molds, drives a whole row of molds upon the endless belt $B^3$. The rammer or pusher A' is connected by the two links or rods $A^2$ $A^2$ to the rammer or pusher N'. It is actuated by the lever $A^3$, which oscillates or rocks on the axis $A^4$. The lever $A^3$ carries at $A^5$ a lever $A^6$ under tension of a spring $A^{12}$, the heel of which lever $A^6$ can engage a notch $A^7$ of a lever $A^8$, which rocks loosely on axis $A^4$. The lever $A^8$ is controlled by a rod $A^9$, connected to a crank $A^{10}$ on the shaft B. The extremity $A''$ of the lever $A^6$ is engaged under the heel of the lever M', which rises at the completion of each twenty-five turns, as will be seen farther on. The endless belt B', which is intended to carry the full molds coming forth from the compartment or pigeonhole A is actuated by the drum $B^2$ (see Figs. 4 and 10) and passes on the guide drum or pulley $B^3$. The drum $B^2$ has on its axle a ratchet-wheel $B^4$, (see Fig. 10,) which is actuated by the pawl $B^5$, carried by the lever $B^6$, pivoted at $B^7$ and moved by the roller $B^8$, which bears on the cam $B^9$. The molds which have thus been pushed along bear against the vertical wall of the hinge C. The door C' swings around the hinge C upon the upper surface of the mold, while the hooks $C^2$ $C^2$ snap upon the vertical surfaces of the upper half-mold. The door C' is actuated by the levers $C^3$ $C^4$ and bell-crank $C^5$, the latter being pivoted at $C^9$ and carrying the friction-roller $C^6$, which is pressed by the spring $C^7$ on the cam $C^8$. The lever $C^4$ is guided in its movement by the link $C^{11}$, hinged at $C^{12}$. (See Fig. 5.) The closing mechanism of the door C' is the same as that described hereinafter for the door $H^\times$, which appears clearly in Fig. 5. Simultaneously the finger $C^{10}$, fixed on the lever $C^4$, liberates the heel of the lever D', pivoted at $D^2$ and actuated by the spiral spring $D^3$. (See Fig. 8.) The rods $D^4$ $D^4$, which are pivoted to the lever D', raise the curved needles $D^5$ $D^5$, which are pivoted at $D^6$ $D^6$. These needles penetrate a little into the ends of the bunch which is ready to be taken out of the mold. At that moment the door C' comes back and carries between the hooks $C^2$ $C^2$ the upper half-mold. The hooks $C^2$ $C^2$ bear with their heels 1 1 on the tappets 2 2, and the half-mold, which has been brought back by the door C', is then completely free. Figs. 11, 12, and 13 show clearly this action of the hooks $C^2$ $C^2$ for opening the molds. In Fig. 11 the half of a right side is shown in accordance with Fig. 13 and represents the two halves $x$ $x$ of the mold applied one on the other at the moment when the door C', pivoting around the hinge C, turns down on the upper half-mold. When the door turns down, the hook $C^2$, which is drawn on by the spiral spring 3, sets on the vertical surface of the upper half-mold. The left half of Fig. 11, corresponding with Fig. 12, represents the two halves of the open mold, the door C' having brought back the upper half-mold held between the two hooks $C^2$. At the same time the heels 1 of these hooks $C^2$ strike against the fixed pieces 2, and the hooks are thrown out, thus releasing the half-mold. When the half-molds $x$ $x$ have been driven off by the longitudinal rammers or pushers G G, as described hereinafter, the door C' rises and carries along the hooks $C^2$, and the latter, which are released from the pieces 2, snap on the vertical surface of the door C', which thus limits their movement. The ends of the hooks are inclined, so as to slide upon and engage a fresh half-mold. The needles or pins $D^5$ $D^5$ have held the bunch in the lower half-mold, and as the mold is opened by the hooks $C^2$ $C^2$ the gripper comes down to take the bunch left in the lower half-mold. The part E of the gripper is fixed on the lever $E^2$. The part E' is pivoted to the lever at $E^3$ and is pressed toward the part E by a spring $E^4$. (See Figs. 8, 9, and 10.) The lever $E^2$ is pivoted at $E^5$ and is actuated by the lever $E^6$, which carries a friction-roller $E^7$, pressing on the cam $E^8$, under the tension of a spring $e$. On the back of the lever $E^2$ a lever $F^2$ is hinged at F, and the extremity F' of this lever is in position to be pressed by a finger $F^3$, whereby the movable part E' of the gripper can be moved by the extremity $F^2$. The finger $F^3$ is fixed on the piece $F^4$, sliding horizontally under the action of the lever $F^5$, pivoted at $F^6$ and moved by the connecting-rod $F^7$, which is pivoted at $F^8$ to the lever $B^6$, operated by cam $B^9$, as hereinbefore described. When the tongs or gripper descend upon the bunch, they are open. They close by means of the mechanism above described, taking tight hold of the bunch, which rises with the gripper into the position shown by Figs. 1 and 2. A moment later a new opening movement of the gripper produced by the boss $F^9$ of the cam $B^9$, Fig. 10, releases the bunch, which falls from the gripper. The two empty half-molds, from which the bunch has been taken out, are now in front of the extremities of the pushers G G, which push the half-molds into the position indicated by H H' by a horizontal rectilinear movement. The rammers or pushers G G are fixed on the piece G', which is actuated through a connecting-rod $G^2$ by an elbow-lever $G^3$, swinging around the axis $G^4$, and the sliding rod $G^5$, moved by the crank-pin $G^6$, which is keyed on the shaft B. The spiral spring $G^7$ returns the rammers or pushers G to their rear position. (See Fig. 2.) The operator thus has in front of himself at point H H' two open half-molds and rolls roughly a cigar-bunch which is placed into the half-mold at H' while holding the bunch at the two ends. Then the machine is thrown into gear by means of the treadle or pedal X³. When the bunches are rolled by machine-work, the receiver or pusher of these machines is arranged over the half-mold at point H', which shall hold the bunch. In this case the mold-machine is mechanically connected with the bunch-rolling machine. As soon as the bunch is placed into the half-mold at H' the door H×, pivoting around the hinge h, lifts the half-mold at H, which it turns down on the half-mold at H', thus inclosing the bunch. The door H× is actuated by the rod H², pivoted on the lever C⁴. (See Fig. 5.) The fork H³, which carries the two heads h' h³, then pushes the closed and filled mold between the two jaws I' I². The fork H³, rocking at H⁴, is actuated by the lever H⁵, which carries the friction-roller H⁶, which presses on the cam H⁷. (See Fig. 5.) The upper jaw I' then closes down upon the mold by the action of the spring I, which acts upon the elbow-lever I³, pivoting at I⁴. One of the arms of the lever I³ carries a friction-roller I⁵, pressing on the cam I⁶. A projection I⁷ of the lever I³ presses in this movement on the elbow-lever I⁸, pivoting at I⁹ in such a manner as to lift the movable catch I¹⁰, which holds the lower half-mold against lateral movement. The two jaws I' are provided with spring-pressed movable bottoms or followers, which exert a yielding pressure upon the molds. The lower jaw I² is fixed to the extremity of the lever J, swinging around the axis J', and this lever J carries the friction-roller J², which presses on the cam J³ by means of the spiral spring J⁴. (See Fig. 5.) The cam J³ has a certain number of undulations, which cause the lower half-mold to oscillate in its relation to the upper half-mold. These movements of the molds, the extreme positions of which are shown in Figs. 6 and 7, combined with the progressive vertical pressure imparted by the jaw I', have the effect of forcing into the molds the pieces of tobacco-leaf which form lateral burs or seams where the two half-molds join and to even up the compactness of the tobacco in the bunch. Two sets of shears K K' and K² K³, one set at each end of the molds, then clip the ends of the bunch which stand out from the ends of the molds. The blades K K' are attached to the arms of the jaw I', and the blades K² K³ are fixed on the levers K⁴ K⁵, turning on the shaft I⁴, which shaft is actuated by the lever K⁷, which is operated by the friction-roller K⁸, which bears against the cam K⁹. (See Fig. 2.) The rod L, fixed on the plate G', which is actuated in the manner as above stated, then pushes endwise the mold pressed down by the jaws into the slide L'. (See Fig. 4.) During that time the rammers or pushers G, which participate in the same movement, bring two new half-molds into the position indicated at H H'. At that moment the grippers release the bunch which they held and let it fall on the upper surface of the rammer or pusher G, which carries the bunch back in front of the extremity of the piece F⁴, which comes forward and drives the bunch into the box F¹⁰. The mold which has been guided into the slide L' is held there under pressure by the downwardly-pressing strips L² L³, which are guided vertically by the rods l. The elbow-lever L⁴ (see Fig. 1) pushes, successively, all the molds on the table X' under these strips. The lever L⁴, pivoting around axis L⁵, is actuated by the connecting-rod L⁶, which is drawn on by the crank-pin L⁷, keyed on the shaft b. When the row of molds arranged side by side under pressure on the table X' has reached a sufficient length, the last mold strikes a movable spur M, situated at the extremity of the elbow-lever M', which swings around the axis M². (See Fig. 1.) The inclined plane M³ then rises and pushes the friction-roller M⁴, fixed on the lever M⁵, keyed on the axis M⁶, which controls the rack-escapement M⁷ M⁸. One tooth of the rack M⁹ is then liberated. This rack glides vertically in the slides m' m² and carries at its upper part the pigeonhole or compartment N, which thus descends by the height of one mold. The rammer or presser N' has the length of twenty-five molds and is as high as one mold. It travels ahead between the table X' and the strips L² L³, pushing twenty-five molds into the pigeonhole compartment N. The pusher N' is operated by the same mechanism as A', as hereinbefore referred to. The spur M, brought back by the spring N², returns to its original position when the pusher N' has come back to its rear position. While the pusher N' has put in place the twenty-five molds, these molds raise slightly the weighting-roller N³, attached to the strip L³ by the connecting-rods N⁴ N⁵. In this manner the molds are under constant pressure while they are pigeonholed in the compartment N. When the pigeonhole compartment N is full, it is carried into a drying-place, if necessary. When the bunches have been in the mold for a sufficient length of time and when they are ready to be taken out, the pigeonhole compartment is put on the machine at A, Fig. 4, as before detailed.

We claim—

1. In a cigar-bunch-molding machine of the kind described, a mold-receiver having a hinged cover, means for feeding the previously-filled molds singly to said receiver, grippers carried by said cover for opening the mold, means for operating said hinged cover and grippers, and removing means for removing the completed cigar-bunch from the mold, substantially as described.

2. In a cigar-bunch-molding machine of the class described, a mold-receiver having a hinged cover, means for singly feeding the previously-filled molds thereto, grippers carried by said cover for engaging the upper half of the mold, means for operating said cover and grippers to remove the upper half of the mold, means for retaining the bunch in the lower half-mold while the upper half is being removed, and means for removing the bunch from the lower half, substantially as described.

3. In a cigar-bunch-molding machine of the kind described, a mold-receiver, means for feeding the previously-filled molds thereto, means for removing the upper half of the mold, needles adapted to penetrate the ends of the bunch before the mold is opened to hold it in the lower half-mold while the upper half is being removed, means for operating said needles, and means for removing the bunch from the lower half-mold, substantially as described.

4. In a cigar-bunch-molding machine of the class described, a mold-receiver, means for feeding the previously-filled molds thereto, means for opening the mold, a pair of tongs or grippers arranged to remove the bunches from the opened molds, and a carrier for removing the bunches from the grippers, substantially as described.

5. In a cigar-bunch-molding machine, a mold-receiver, means for feeding the previously-filled molds to said receiver, means for opening said molds while in the receiver, means for removing the molded bunch from the lower half-mold, a second receiver, means for transferring the molds to said second receiver in position to be filled, means for closing the mold after a fresh bunch has been placed therein, a receptacle for the molds under pressure, and means for conveying the freshly-filled molds thereto from the second receiver, substantially as described.

6. In a cigar-bunch-molding machine, the combination with the mold opening and closing devices, of a slideway arranged to receive the molds side by side, a removable receptacle supported adjacent to said slideway, means for removing a row of molds from said slideway into said receptacle, means for lowering the receptacle as the successive rows of molds are placed therein, and a presser-roller arranged to maintain said molds under pressure while in said receptacle, substantially as described.

7. In a cigar-bunch-molding machine, the combination with the mold opening and closing devices, of a removable compartment arranged to be placed at the delivery side of the machine to receive the filled molds and also arranged to be placed at the feed side of the machine, means for transferring the molds from the closing devices to said receptacles on the delivery side and means for transferring the filled molds from said receptacles on the feed side to the mold-opening devices, substantially as described.

8. In a cigar-bunch-molding machine of the kind described, the combination with the devices for opening the filled molds and closing them, of a receptacle containing the filled molds, an endless belt having an intermittent movement, for conveying the filled molds in proximity to said opening devices, and means for delivering the molds from said receptacle to said endless belt, substantially as described.

In witness whereof we have hereunto set our hands in presence of two witnesses.

ANTOINE GROUVELLE.
EMILE BELOT.

Witnesses:
EDWARD P. MACLEAN,
JULES FAYOLLET.